United States Patent [19]

Yamamoto et al.

[11] Patent Number: 4,735,757

[45] Date of Patent: Apr. 5, 1988

[54] PROCESS FOR PRODUCING IMPROVED CERAMIC FIBER MOLDINGS

[75] Inventors: Masafumi Yamamoto; Tatsuo Fukuzaki, both of Aichi, Japan

[73] Assignee: Isolite Babcock Refractories Co., Ltd., Aichi, Japan

[21] Appl. No.: 858,858

[22] Filed: Apr. 30, 1986

Related U.S. Application Data

[63] Continuation of Ser. No. 419,345, Sep. 17, 1982, abandoned.

[30] Foreign Application Priority Data

Sep. 30, 1981 [JP] Japan ................. 56-155991

[51] Int. Cl.⁴ ................. C04B 41/50; C04B 41/85
[52] U.S. Cl. ................. 264/119; 264/109; 264/62; 264/63; 264/122; 264/131; 264/234; 427/376.2; 427/376.3; 427/190; 427/443.2; 106/287.34

[58] Field of Search ................. 264/136, 137, 178 R, 264/62, 63, 60, 129, 131, 109, 119, 234, 345, 122; 427/376.2, 376.3, 190, 443.2; 106/287.34, 302

[56] References Cited

U.S. PATENT DOCUMENTS

| | | | |
|---|---|---|---|
| 3,077,413 | 2/1963 | Campbell | 264/60 |
| 3,632,709 | 1/1972 | Hayes | 264/63 |
| 3,702,279 | 11/1972 | Ardary | 264/60 |
| 3,861,938 | 1/1975 | Jackson | 407/190 |
| 3,932,161 | 1/1976 | McNish | 264/60 |

Primary Examiner—Jan H. Silbaugh
Assistant Examiner—Hubert C. Lorin
Attorney, Agent, or Firm—Robert J. Edwards; J. Henry Muetterties; Mark B. Quatt

[57] ABSTRACT

A process for producing an improved ceramic fiber molding by submersing the molding into a suspension containing colloidal silica and/or colloidal alumina and chromium oxide powder. The chromium oxide is deposited onto the ceramic fibers thereby increasing the molding's resistance to linear shrinkage and corrosion when subjected to high temperatures.

7 Claims, No Drawings

PROCESS FOR PRODUCING IMPROVED CERAMIC FIBER MOLDINGS

BACKGROUND AND SUMMARY OF THE INVENTION

This application is a continuation of application Ser. No. 419,345 filed Sept. 17, 1982, now abandoned.

This invention relates to an improved ceramic fiber molding and the method of making the same.

Ceramic fiber moldings are formed into many shapes and used for many purposes, generally moldings are used as furnace lining in the form of plates, cylinders and furnace construction members such as burner blocks. Presently such ceramic fiber moldings are produced by dispersing and suspending the fibers in a large amount of water together with a binder such as colloidal silica and colloidal alumina. The suspended ceramic fibers are collected by filtering to form the desired shape by either wet pressing or vacuum forming. Ceramic fibers for such purposes include aluminosilicate fiber and high alumina fibers. The aluminosilicate fiber is produced by blowing or spinning a melt consisting of 43 to 57 wt% of silica, 43 to 57 wt% of alumina, and less than 3 wt% of metal oxides or impurities. The high alumina fiber is produced by spinning a viscous solution of salts consisting of 3 to 20 wt% of silica, 80 to 97 wt% of alumina, and less than 1 wt% of other metal oxides, and subsequently converting the spun fibers into polycrystals of oxides by heating.

It is known that when chromium oxide, in an amount of 0.5 to 10 weight percent is incorporated into the ceramic fiber composition or chemically attached to the fiber surface the heat resistance of the ceramic fiber is improved. However, the method of making aluminosilicate fiber by blowing or spinning a melt has the disadvantage in that the addition of chromium oxide to the composition changes the properties of the composition, particularly the viscosity of the melt, to such an extent that it is difficult to control the blowing or spinning of the fibers. On the other hand, the method of chemically attaching the chromium oxide to the fiber surface has a shortcoming in that the chromium oxide attached to the fiber surface evaporates within a short period of time when exposed to high temperatures.

The present invention discloses a method which prevents the chromium oxide from evaporating at high temperatures when ceramic fiber moldings are impregnated with chromium oxides. This method limits shrinkage and corrosion of the ceramic fiber moldings.

The process characterizing the present invention comprises dipping a ceramic fiber molding into a suspension containing either or both colloidal silica and colloidal alumina, in an amount of 0.2 to 1.0 wt% as solids based on the weight of the water of the suspension, and containing chromium oxide powder having a particle diameter smaller than 62 microns in an amount less than 30 wt% based on the weight of the water of the suspension, thereby impregnating said alumina-silica ceramic fiber molding with chromium oxide powder in an amount of 10 to 50 wt% based on the weight of the undipped ceramic fiber molding.

It is an object of this invention to produce ceramic fiber moldings which exhibit improved resistance to linear shrinking.

It is the further object of this invention to produce a ceramic fiber molding which is corrosion resistant.

DETAILED DESCRIPTION OF THE INVENTION

In accordance with the present invention an improved ceramic fiber molding exhibiting a significant high temperature shrink resistance and corrosion resistance is produced by a novel method of impregnating the fiber molding with chromium oxide powder. The ceramic fiber material produced by this technique has shown a greater resistance to corrosion and linear shrinkage at elevated temperatures than unimpregnated material.

When a ceramic fiber molding is simply dipped in an aqueous dispersion of chromium oxide powder, the impregnation is limited to only the surface of the molding because of the filtration action of fine ceramic fibers which are mostly 1 to 5 microns in diameter. Uniform impregnation, however, can be accomplished when chromium oxide powder is dispersed in a solution containing colloidal silica and colloidal alumina, the chromium oxide is carried into the central structure of the ceramic fiber molding by capillary action. With such uniform impregnation, the ceramic fibers are coated with chromium oxide powder and colloidal silica-alumina, the impregnated chromium oxide reacts with the aluminum oxide in the ceramic fiber, and builds up a $Cr_2O_3$—$Al_2O_3$ solid solution when subjected to a high temperature. This solid solution prevents chromium oxide from evaporating and improves the resistance to heat and corrosion particularly to corrosion caused by iron and iron oxide.

The ceramic fiber molding which has undergone the dipping process embodied in this invention may be used as such, but further improvement can be accomplished if the product is subject to heat treatment at 900° to 1200° C. after dipping.

The chromium oxide powder used in this invention should be one which has a particle diameter smaller than about 62 microns. Powder coarser than this size does not infiltrate the ceramic fiber molding but stays in the vicinity of the surface of the molding.

The colloidal silica and colloidal alumina are not effective when added in amounts less than 0.2 wt% since amounts less than 0.2 wt% are too small to carry the chromium oxide into the central structure of the ceramic fiber molding. On the other hand, if added in an amount greater than 1 wt%, decreases the effect of the impregnated chromium oxide to resist linear shrinkage and corrosion when the molding is subjected to high temperatures, since the colloidal alumina-silica increases the heat shrinkage of the molding.

Since chromium oxide powder added to water in amounts greater than 30 weight percent settles to the bottom of the mixing container it is necessary to agitate the dispersion while dipping the ceramic fiber molding. In the case of thin dispersion repetitive dipping is required until the ceramic fiber molding is impregnated with as much chromium oxide as necessary. On the other hand, a thick dispersion will cause clogging to occur at the surface of the ceramic fiber molding thereby preventing the uniform coating of all the ceramic fibers.

This invention will be described with reference to the following tests.

SAMPLES 1–8

A slurry was prepared by dispersing 100 parts by weight of aluminosilicate fiber (sold under the trademark KAOWOOL by The Babcock & Wilcox Company, consisting of about 52.3 wt% of $SiO_2$ and about 47.3 wt% of $Al_2O_3$ and about 0.4 wt% of impurities), into 5000 parts by weight water and then adding with agitation 20 parts by weight of commercial colloidal silica in aqueous solution. A flat plate ceramic fiber molding, 20 mm thick, having a bulk density of 0.25 g/cm$^3$ was produced by depositing the slurry together with a binder onto a suction screen, wet pressing and thereafter drying the slurry.

The ceramic fiber molding made in the above manner was impregnated with chromium oxide by dipping it into the dispersion prepared by adding alumina sol in an amount of 0.3 wt% as solids and silica sol in an amount of 0.2 wt% as solids to water, and then adding chromium oxide powder in an amount of 5 to 30 wt% based on the weight of the water. The chromium oxide powder contains 96 wt% of particles that pass through a sieve of 325 mesh.

After drying, ceramic fiber moldings impregnated with chromium oxide were subjected to heat shrinkage tests run at 1100° C. and 1200° C. for 24 hours each.

The results are shown in Table 1. It is noted that the specimens impregnated with chromium oxide exhibit less linear shrinkage than those specimens not impregnated with chromium oxide. The coating of chromium oxide in Samples 1 and 2 showed signs of warping, separating and cracking during heating. Samples 3 to 7 had less chromium oxide impregnated on the fibers and these Samples experienced little or no warping and cracking. Sample 8 which had no chromium oxide impregnated thereon was used as the control sample.

TABLE 1

| Sample No. | Content of Chromium oxide of impregnant (%) | Time of Impregnation (sec) | Quantity of chromium oxide impregnated (%) | Linear Shrinkage on heating | |
|---|---|---|---|---|---|
| | | | | 1100° C. (%) | 1200° C. (%) |
| 1 | 30 | 30 | 68 | 1.3 | 1.4 |
| 2 | 25 | 30 | 59 | 1.2 | 1.4 |
| 3 | 20 | 30 | 52 | 1.3 | 1.5 |
| 4 | 15 | 30 | 41 | 1.5 | 1.7 |
| 5 | 10 | 30 | 32 | 1.8 | 2.1 |
| 6 | 5 | 20 | 18 | 2.2 | 2.5 |
| 7 | 2 | 20 | 6 | 2.4 | 2.9 |
| 8 | 0 | 20 | 0 | 2.6 | 3.2 |

SAMPLES 9–14

A flat plate ceramic fiber molding, 20 mm thick, having a bulk density of 0.15 g/cm$^3$, was produced in the same manner as in Samples 1 to 8 from a slurry prepared by dispersing 50 parts by weight of the same aluminosilicate fiber and 50 parts by weight if high-alumina fiber (sold under the trademark SAFFIL by Imperial Chemical Industries, Limited), consisting of about 5 wt% of $SiO_2$ and about 95 wt% of $Al_2O_3$.

The ceramic fiber molding prepared in the above step was impregnated with chromium oxide and alumina sol and silica sol as in Samples 1–8.

After drying, ceramic fiber moldings impregnated with chromium oxide were subjected to heat shrinkage tests for 24 hours each at 1300° C. and 1400° C. The moldings were also subjected to corrosion resistance tests in which iron powder was spread onto the sample in an amount of 0.05 g/cm$^2$ before heating at 1400° C. for 24 hours.

The results are shown in Table 2. The samples impregnated with at least 20% chromium oxide, Samples 9 to 12, exhibited almost no corrosion while Sample 13 and Sample 14 experienced considerable corrosion.

TABLE 2

| Sample No. | Content of Chromium oxide of impregnant (%) | Time of Impregnation (sec) | Quantity of chromium oxide impregnated (%) | Linear Shrinkage on heating | |
|---|---|---|---|---|---|
| | | | | 1300° C. (%) | 1400° C. (%) |
| 9 | 30 | 30 | 71 | 0.6 | 0.6 |
| 10 | 20 | 20 | 51 | 0.6 | 0.6 |
| 11 | 10 | 20 | 36 | 0.6 | 0.7 |
| 12 | 5 | 20 | 20 | 0.8 | 0.9 |
| 13 | 2 | 20 | 7 | 0.9 | 0.9 |
| 14 | 0 | 20 | 0 | 0.9 | 1.0 |

It is possible to impregnate the ceramic fiber molding with as much as 50 weight percent chromium oxide based on the weight of the undipped molding, but impregnation of more than about 50 wt% becomes nonuniform. On the other hand, impregnation less than 10 wt% does not provide sufficient heat resistance and corrosion resistance. As shown above, the best results are obtained when impregnation is carried out in the range of about 10 to 70 wt%, in combination with the binder of colloidal silica and alumina.

The embodiments of the invention in which an exclusive property or privilege is claimed are defined as follows:

1. A process for producing an improved alumina-silica fiber molding which is resistant to thermal shrinkage and corrosion, comprising the steps of:
   preparing an aqueous suspension containing colloidal silica and chromium oxide powder, the colloidal silica being present in an amount of 0.2 to 1.0 weight percent of the water in the suspension, the chromium oxide powder having a particle diameter smaller than 62 microns and being present in an amount of from 5 to 30 weight percent of the water in the suspension;
   providing an alumina-silica fiber molding which is made of bound together alumina-silica fibers;
   submersing the alumina-silica fiber molding into the suspension so that the chromium oxide is carried into the alumina-silica fiber molding by capillary action to uniformly impregnate the molding; and
   forming a solid solution of the chromium oxide with the alumina of the fibers in the alumina-silica fiber molding.

2. The process according to claim 1 wherein the step of preparing a suspension includes adding a colloidal alumina.

3. The process according to claim 2 wherein the total amount of colloidal silica and colloidal alumina is 0.2 to 1.0 weight percent of the suspension.

4. The process according to claim 3 including forming the alumina-silica fiber molding by dispersing and suspending alumina-silica fibers in water and a binder, collecting the fibers to form a desired shape for the molding, and drawing the shape to form the molding of bound together fibers.

5. A process for producing an improved alumina-silica fiber molding comprising:
   providing an alumina-silica fiber molding made of bound together alumina-silica fibers;
   submersing the alumina-silica fiber molding into an aqueous suspension containing at least one colloidal material selected from the group of colloidal silica and colloidal alumina, said colloidal material being present in the amount of 0.1 to 1.0 weight percent of water in the suspension, and 5 to 30 weight percent chromium oxide powder, the powder having a diameter smaller than 62 microns, whereby the alumina-silica fiber molding is uniformly impregnated with the powder in an amount of 10 to 50 weight percent based on the weight of the fiber molding, the powder impregnating the molding by capillary action between the bound fibers of the molding.

6. The process according to claim 5 wherein the impregnated fiber molding is subjected to heat treatment at 900° C. to 1,200° C. after submersing the fiber molding.

7. The process according to claim 6 wherein the alumina-silica fiber molding is provided by first dispersing and suspending alumina-silica fibers in water plus a binder, collecting the fibers to form a desired shape, and drying the shape to form the molding of bound together fibers.

* * * * *